United States Patent Office.

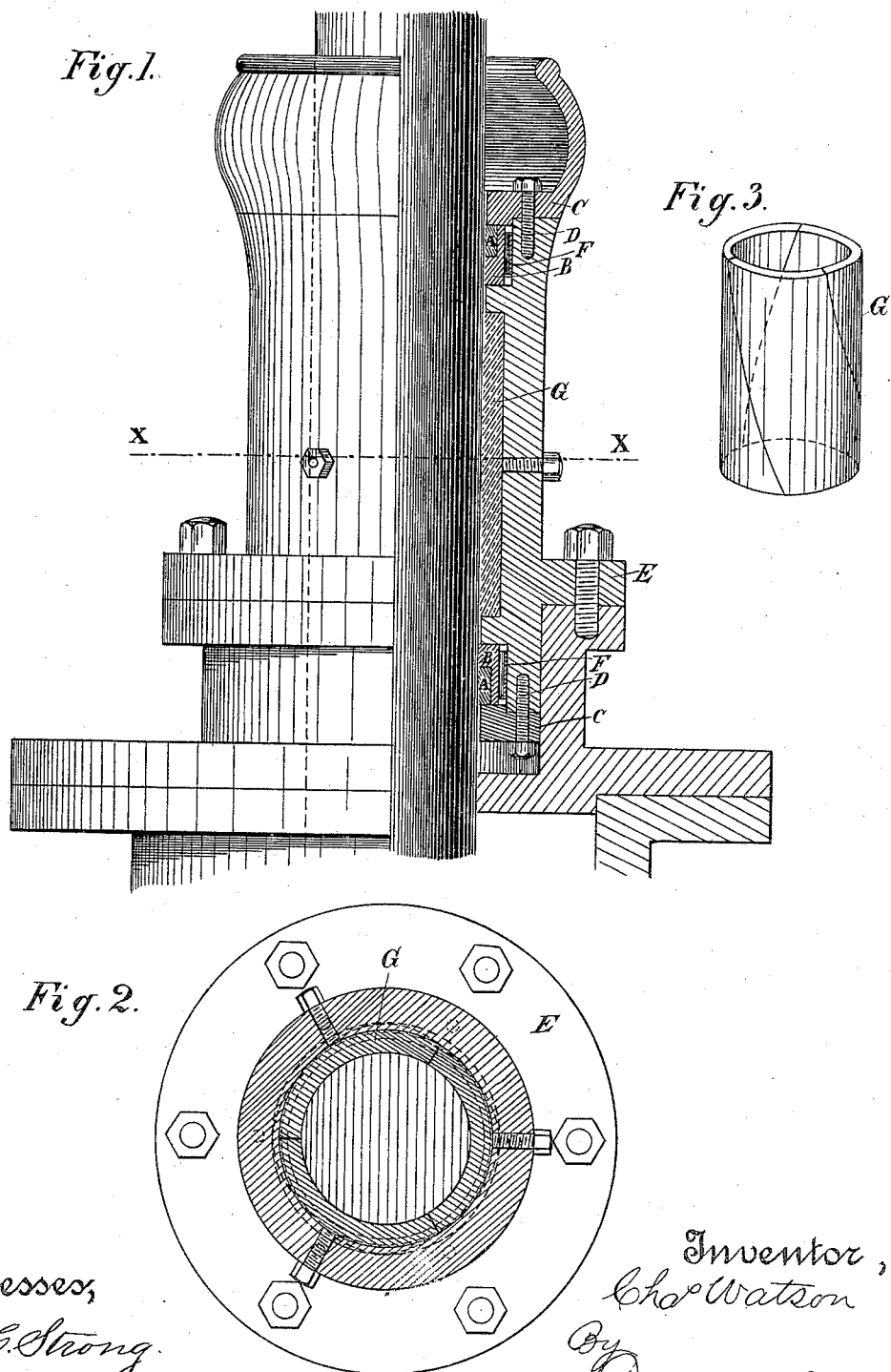

CHARLES WATSON, OF SAN FRANCISCO, CALIFORNIA.

PISTON-ROD AND VALVE-STEM PACKING.

SPECIFICATION forming part of Letters Patent No. 341,973, dated May 18, 1886.

Application filed February 24, 1886. Serial No. 193,074. (No model.)

*To all whom it may concern:*

Be it known that I, CHARLES WATSON, of the city and county of San Francisco, State of California, have invented an Improvement in Piston-Rod and Valve-Stem Packing; and I hereby declare the following to be a full, clear, and exact description of the same.

My invention relates to the improvement in packing for piston-rods and steam-valve stems or other rods which reciprocate through a joint which will be exposed to steam or vapor under pressure.

It consists of a set of spring-actuated packing-rings fitted at either end of the stuffing-box gland, and, in combination therewith, of an intermediate ring of greater width fitted to the rod, and in certain details of construction, all of which will be more fully explained by reference to the accompanying drawings, in which—

Figure 1 is a view one half of which shows a side exterior elevation and the other a longitudinal section. Fig. 2 is a plan view in section taken through X X, Fig. 1. Fig. 3 is a view of the phosphor bronzing.

In the construction of marine engines, and especially of that class in which the cylinder is vertical, so as to drive a propeller, the piston-rod is continued through the rear or upper end of the cylinder, so as to form a guide at that end, and thus support the weight of the piston and prevent its pressing heavily against the sides of the cylinder with the rolling and pitching of the vessel. In order to pack the stuffing-boxes of these piston-rods I employ rings A and B, which are cut and arranged to break joints in the manner usual to this class of packing-rings. These rings may be either made as shown—the exterior one of an L shape, forming a chamber into which the smaller interior one is fitted—or there may simply be two sets of equally wide rings, one being placed exterior to the other, and these are held in place in the gland by means of heads or disks C, secured by bolts D, the gland being fitted into the chamber of the stuffing-box and held by bolts through the flange E. Springs F are fitted into the space around the packing-rings at intervals, so as to press upon them and hold them in contact with the piston-rod. The gland has a cylindrical chamber turned in it, extending nearly the entire distance between these rings B, which are at the ends of the gland, as before stated, and within this chamber is fitted a broad ring of any suitable metal, G. I have found phosphor-bronze to be very suitable for the purpose. This ring is preferably made in sections, the ends being cut diagonally, so that they will not score the piston-rod at their points of junction. These sections inclose and fit upon the rod, forming a broad packing-band intermediate between the rings before described. They are secured in position by three set-screws, enabling the sections to be adjusted in case of wear. The gland is bored sufficiently larger than the piston-rod so as to leave a space on all sides, which will prevent the rod coming in contact with the interior of the gland itself; but it will be supported by this broad split ring, which, in combination with the packing-rings before described, will make a very perfect joint, which will not be deranged and cause a leak by the movement of the vessel, as is the case when only the packing-rings B alone are used.

Having thus described my invention, what I claim as new, and desire to secure by Letters Patent, is—

1. A gland through which a reciprocating rod passes, having its interior bored larger than the diameter of the rod, and packing-rings fitted in the ends of the gland with springs, by which they are held in contact with the rod, in combination with an intermediate band fitting a chamber within the gland and pressing upon the piston-rod so as to support it and keep it out of contact with the interior of the gland, substantially as herein described.

2. The elastic packing-rings fitted to the ends of a gland through which a rod reciprocates, in combination with an intermediate sectional ring fitted into the gland so as to clasp the rod, and the set or adjusting screws, substantially as herein described.

In witness whereof I have hereunto set my hand.

CHARLES WATSON.

Witnesses:
S. H. NOURSE,
H. C. LEE.